United States Patent [19]

Huang et al.

[11] Patent Number: 4,663,757

[45] Date of Patent: May 5, 1987

[54] PACKET SWITCHED LOCAL NETWORK WITH PRIORITY RANDOM SPLITTING AND CONFLICT DETECTION

[75] Inventors: Jian-Cheng Huang; Chia-Lung Yeh, both of Rochester, N.Y.

[73] Assignee: Eastman Kodak Company, Rochester, N.Y.

[21] Appl. No.: 770,478

[22] Filed: Aug. 29, 1985

[51] Int. Cl.[4] .............................................. H04J 3/26
[52] U.S. Cl. ........................................ 370/85; 370/94
[58] Field of Search ............................ 370/85, 94, 89; 340/825.5, 825.51

[56] References Cited

U.S. PATENT DOCUMENTS

| | | | |
|---|---|---|---|
| 4,063,220 | 12/1977 | Metcalfe et al. ................. | 340/825.5 |
| 4,459,589 | 7/1984 | Ito ..................................... | 340/825.5 |
| 4,516,239 | 5/1985 | Maxemchuk ....................... | 370/85 |
| 4,519,068 | 5/1985 | Krebs et al. ........................ | 370/94 |
| 4,581,734 | 4/1986 | Olson et al. ....................... | 370/94 |
| 4,592,049 | 5/1986 | Killat et al. ........................ | 370/89 |

OTHER PUBLICATIONS

Tree Algorithms for Packet Broadcast Channels, J. T. Capetanakis, IEEE Trans. on Inform. Theory, vol. IT-25, No. 5, 9/79, p. 4, line 10.

A Perspective on Multiaccess Channels, R. G. Gallager, IEEE Trans. on Inform. Theory, vol. IT-31, No. 2, 3/85.

Ethernet: Distributed Packet Switching for Local Computer Networks, R. M. Metcalfe et al, Communications of ACM, Jul. 1976, vol. 19, No. 7.

Capetanakis, IEEE Trans. of Comm., vol. COM-27, No. 10, 10/79.

Pacet Switching in Radio Channels: Part 1-Carrier Sense Multiple-Access Modes & Their Throughput-Delay Characteristics, Kleinrock et al, IEEE Trans. on Com., vol. COM-23, No. 12, 9/75.

Primary Examiner—Douglas W. Olms
Attorney, Agent, or Firm—Thomas H. Close

[57] ABSTRACT

A packet switched local communication system includes means for detecting collisions and resolving conflicts between transmitting terminals by a random splitting process. In transmitting mixed types of information comprising short packets and long packets, priority of transmission is given to short packets.

9 Claims, 14 Drawing Figures

CONTROL PARAMETERS

| ROW | F | G | S | B D1 | D2 | D3 | I1 | I2 | I D1 | D2 | D3 | I1 | I2 | R I1 | I2 | U |
|---|---|---|---|---|---|---|---|---|---|---|---|---|---|---|---|---|
| 1 |   | 2 | 0 |   |   |   |   |   | 2 | 2 | 2 | 1 | 1 | 0 | 0 | 0 |
| 2 | 3 | 3 | 0 | 0 |   | 1 |   | 0 | 2 | 3 | 2 | 1 | 1 | 0 | 0 | 0 |
| 3 | 1 | 2 | 1 |   |   |   |   |   | 2 |   | 2 | 1 | 1 | 0 | 0 | 0 |
| 4 | 3 | 3 | 1 | 1 |   |   |   | 1 | 3 |   | 3 | 1 | 1 | 0 | 0 | 0 |
| 5 | 3 | 4 | 1 | 0 |   |   |   | 0 | 3 |   | 3 | 1 | 1 | 0 | 0 | 0 |
| 6 | 0 | 3 | 1 |   |   |   |   |   | 3 |   | 3 | 1 | 1 | 0 | 0 | 0 |
| 7 | 3 | 4 | 1 | 0 |   |   |   | 1 | 3 |   | 4 | 1 | 1 | 0 | 0 | 0 |
| 8 | 1 | 3 | 1 |   |   |   |   |   | 3 |   |   | 1 | 1 | 0 | 0 | 0 |
| 9 | 1 | 2 | 1 |   |   |   |   |   |   |   |   | 1 | 1 | 0 | 0 | 0 |
| 10 | 0 | 1 | 1 |   |   |   |   |   |   |   |   | 1 | 1 | 0 | 0 | 0 |
| 11 | 0 | 2 | 0 |   |   |   |   |   |   |   |   | 1 | 1 | 0 | 0 | 0 |
| 12 | 0 | 1 | 0 |   |   |   |   |   |   |   |   | 1 | 1 | 0 | 0 | 0 |
| 13 | 3 | 2 | 0 |   |   |   | 0 | 1 |   |   |   | 1 | 2 | 1 | 1 | 1 |
| 14 | 2 | 2 | 0 |   |   |   |   |   |   |   |   | 1 |   | 1 | 0 | 1 |
| 15 | 0 | 1 | 0 |   |   |   |   |   |   |   |   | 1 |   | 1 |   | 0 |
| 16 | 2 |   |   |   |   |   |   |   |   |   |   |   |   | 0 |   | 0 |

FIG. 10

FIG 11

PACKET SWITCHED LOCAL NETWORK WITH PRIORITY RANDOM SPLITTING AND CONFLICT DETECTION

TECHNICAL FIELD

The invention relates to a local communication network, and more particularly to a packet switched communication network of the multiple-access broadcast channel type.

BACKGROUND ART

Packet switched communication networks are commonly employed to transfer data between communication terminals over a shared communication channel, such as a coaxial cable, fiber-optic cable, or radio channel. Such communication networks are used to transmit digital data among computers and to link office equipment such as word processors, printers, document scanners, and telefax equipment in a business office environment.

The tradeoffs in providing such a communication network are efficiency, transmission delay, economy, and reliability. Since the communication channel itself is generally a scarce resource, the network must operate to achieve maximum effective use of the channel. To achieve reliability, the system must be designed so that a failure in one part of the system does not lead to an overall shut-down of the communication network.

One type of data communication network that has been found to satisfy many of these needs is the CSMA/CD (carrier sense multiple access with conflict detection). A successful commercial embodiment of CSMA/CD is ETHERNET developed by Xerox Corporation (see U.S. Pat. No. 4,063,220 issued Dec. 13, 1977 to Metcalfe et al).

In a CSMA/CD network, the communication channel is shared by a plurality of terminals. In this type of broadcast multiple-access network, no central device is employed to control the access to the channel. A terminal transmits data packets to other terminals via the common channel, and decisions regarding the transmissions are made according to each terminal's independent observations of the traffic on the channel. Each data packet contains the address of the intended receiver, and is received by all the terminals on the network. Since no central control device is employed, there is less chance that a failure can disable the entire system, thus maximizing the reliability of the system. In CSMA/CD systems, a terminal that is ready to send a packet over the channel, first listens to the channel (carrier sensing) to determine if any other terminal is transmitting. If the channel is busy, the ready terminal waits until it senses that the channel is idle. When the channel is idle (no carrier sensed) the terminal starts transmitting a packet. It is possible in the CSMA/CD system that two or more terminals will transmit simultaneously. This results in a collision. Each terminal has the capability of detecting a conflict resulting from such a collision (conflict detection). When a conflict is detected, all the terminals stop transmitting, and execute a routine to resolve the conflicts. In the ETHERNET system, this routine comprises each terminal delaying for a random period of time before attempting to retransmit.

While data communication systems such as ETHERNET have proliferated, the need has arisen for transmitting not only conventional data packets which are all of the same length, but also various packets of different lengths.

One example of the need for this type of integrated communication is the need to transmit high quality image information along with conventional data messages over a common data communications network. Specific instances of such a need include the transmission of patient data and X-ray images over a local network within a hospital, or between hospitals or clinics; and the transmission of text and high quality photographic images in an electronic printing environment. Another example is the communication of voice information and conventional data over a communication network, where limited delays of the voice packets are tolerated. In such integrated communication networks, the channel traffic would consist of relatively short packets, and relatively longer packets (e.g. one or more orders of magnitude longer). Data packets are generally 10 to 100 times longer than voice packets, and similarly image packets are generally 10 to 100 times longer than data packets. An entire image is generally three or four orders of magnitude larger than a single data packet, but the single image may be partitioned into 100 or more image packets, so that the image packet is only one to two orders of magnitude larger than a data packet.

It is a straight forward design task to provide a separate channel capable of handling each of the packet sizes to be transmitted. However such a multichannel system is quite expensive. It would be desirable therefore if a single channel network could be adapted to handle efficiently mixed packet sizes.

The problem with this approach is that although the known CSMA/CD systems provide fast access and efficient use of the channel in a local environment, the systems suffer from instability. That is when heavy traffic is applied to the system for a short time such that the system capacity is momentarily exceeded, the system will lock up into a saturated state from which it cannot recover. In this state, the total channel capacity is consumed by attempts to resolve the conflicts and no successful transmissions can take place. Because image packets, for example, would behave as extremely heavy traffic, the problem of instability is encountered in an integrated data/image network.

A packet switched data communication system incorporating a technique called a random splitting or tree method has been proposed. The random splitting or tree method has been mathematically proven to be stable in the presence of bursts of heavy traffic. See the article "Tree Algorithms for Packet Broadcast Channels" by John 1. Capetanakis, IEEE TRANSACTIONS ON INFORMATION THEORY, Vol. IT-25 No. 5, Sept. 1979.

The basic random splitting or tree method was designed for a slotted channel. The length of each slot is equal to the length of a data packet. It requires that each active user of the channel determine his transmission or retransmission according to his independent observations of the global results of the past channel transmissions which are referred to as channel feedbacks. The inherent feedback is ternary, i.e. any user can distinguish the past transmission to be either empty, successful, or in conflict. Users make decisions at slot boundaries. In this method, the communication system alternates between two modes, normal mode and conflict resolution mode. When a collision occurs in normal mode, all transmitters go into conflict resolution mode, all new arrivals wait until the next transition into normal mode, and all packets involved in the collision independently select one of two subsets with equal probability. Each subset can be viewed as corresponding to a branch from the root of a rooted binary tree. In the slot following the collision, the first of these subsets is transmitted. If another collision occurs, this subset is further split into two smaller subsets, corresponding to further branches growing from the original branch. The first of these subsets is transmitted in the next slot, and if this transmission is successful or idle, the second of the subsets is transmitted in the following slot. In general, whenever the transmission of a subset results in a collision, the subset is split and two new branches of the tree are grown from the old branch. Whenever the transmission of a subset is idle or successful (i.e. the slot is empty or contains one packet), the next slot is used to transmit the next subset. When all subsets have been exhausted, the normal mode is again entered.

In theory, the random splitting or tree method has been shown to be absolutely stable. It is capable of achieving a maximum throughput rate of 0.347 packets/slot. However, when it is applied to a local area network, this rate seems too low. Furthermore, it has not been shown how the random splitting or tree method could be implemented distributively in a communication network.

It is therefore the object of the present invention to provide a stable distributively controlled communication system that implements the random splitting or tree method with improved channel throughput. It is a further object of the present invention to provide an integrated data/image network that implements the random splitting or tree method.

DISCLOSURE OF THE INVENTION

Briefly, the objects of the present invention are achieved by providing a multiple access communication channel and communication terminals having means for carrier sensing and conflict detection. Decentralized distributed control of the channel is achieved by employing a random splitting process for conflict resolution and a priority transmission scheme for integrated traffic. Carrier sense and conflict detection permits the fastest access to the channel in the local environment. Random splitting provides absolutely stable operation with distributed control, and the priority transmission guarantees the short data packets a shorter transmission delay than the long data packets.

More specifically, the objects are accomplished by forming a network comprising a communication channel and a plurality of communication terminals. Each of the terminals includes a transceiver for transmitting and receiving information packets and for monitoring the channel to detect the presence of a carrier or a collision between packets, a communication controller for organizing the transmission or retransmission of packets in a decentralized way, and a work station for generating and storing information packets. There are two types of channel traffic, short packets and long packets. The controller receives carrier sense and conflict detect signals from the transceiver and determines whether the channel is silent, busy with a successful short packet transmission, busy with a successful long packet transmission, or busy with a collision among packets.

Transmission of packets is organized into sessions and cycles. A session is defined as the time period required to transmit all the short packets that arrived during the previous session, or to transmit one of the long packets that arrived in the previous cycle if no short packets arrived during the previous session. A session is called a short session if short packets are transmitted during the session, a long session if one long packet is transmitted during the session, and an empty session if no packets are to be transmitted immediately after the end of the previous session.

A cycle is defined as the time period required to transmit successfully all the long packets that arrived during the previous cycle. If no long packets were ready to be transmitted during the previous cycle, the current cycle is ended by an empty session. Thus, a cycle may be an empty session, a number of short sessions followed by an empty session, a single long session, or a plurality of short and long sessions.

The short packets that arrive during any session are all successfully transmitted during the following session by using a random splitting process to resolve transmission conflicts. Similarly, the long packets that arrive during a cycle are all successfully transmitted in the following cycle, likewise by employing a random splitting process. In each cycle, a long session begins only if no short packets arrived in the previous session. In a long session, only one long packet is transmitted, and the rest are held until the next long session. In this way, the transmission of short packets is given high priority over the transmission of long packets, thereby minimizing the delay in transmission of short packets by the transmission of long packets.

Because the system decouples newly arriving packets from previously conflicting packets (i.e. the decoupled conflicting short and long packets are completely resolved in short sessions and cycles respectively) the system is stable. As the demand for channel capacity increases, the delays may get longer, but the efficiency of the channel usage does not decline as in the CSMA/CD systems. Finally, because the carrier sensing and conflict detection process provide fast feedback information for conflict resolution, the channel throughput is much larger than that for the prior art random splitting or tree method.

MODES OF CARRYING OUT THE INVENTION

Figure 1:
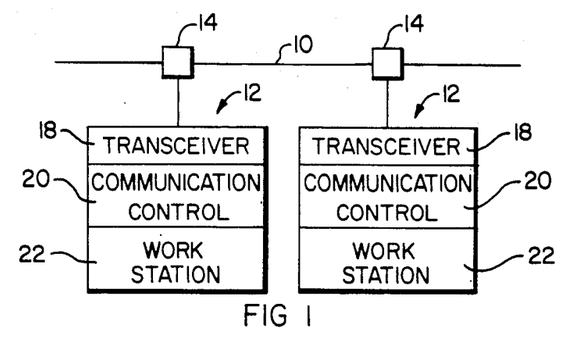
FIG. 1 is a block diagram of a communication system according to the present invention.

The general organization of the packet switched priority random splitting with conflict detection (PRS/CD) communication system according to the present invention is shown in FIG. 1. The system includes a single channel communication medium comprising a coaxial cable 10. A plurality of communication terminals 12 are connected to the communication medium via passive taps comprising coaxial T-connectors 14.

Each terminal 12 includes a transceiver 18 for transmitting and receiving information on the cable 10 and for generating a carrier sense signal CS and a conflict detection signal CD (such a transceiver is known in the prior art, and will not be discussed in further detail); a communication controller 20 for controlling access to the channel by the terminals, and a workstation 22 for generating messages to be transmitted among the terminals and for storing or displaying messages received from other terminals.

The overall organization of the system is similar to the standard CSMA/CD communication systems such as ETHERNET which are presently in use, with the major difference residing in the communication controller 20.

The workstation 22 may include, for example, a computer terminal having a keyboard for generating alphanumeric data input and a monitor displaying the alphanumeric data, or a high resolution image terminal having a scanner for generating high resolution image information and a monitor displaying high resolution images. The data is transmitted in short data packets including the address of the sender and the intended receiver. The image information is transmitted in much longer image packets, 10 to 100 times as long as the data packets.

Figure 2:
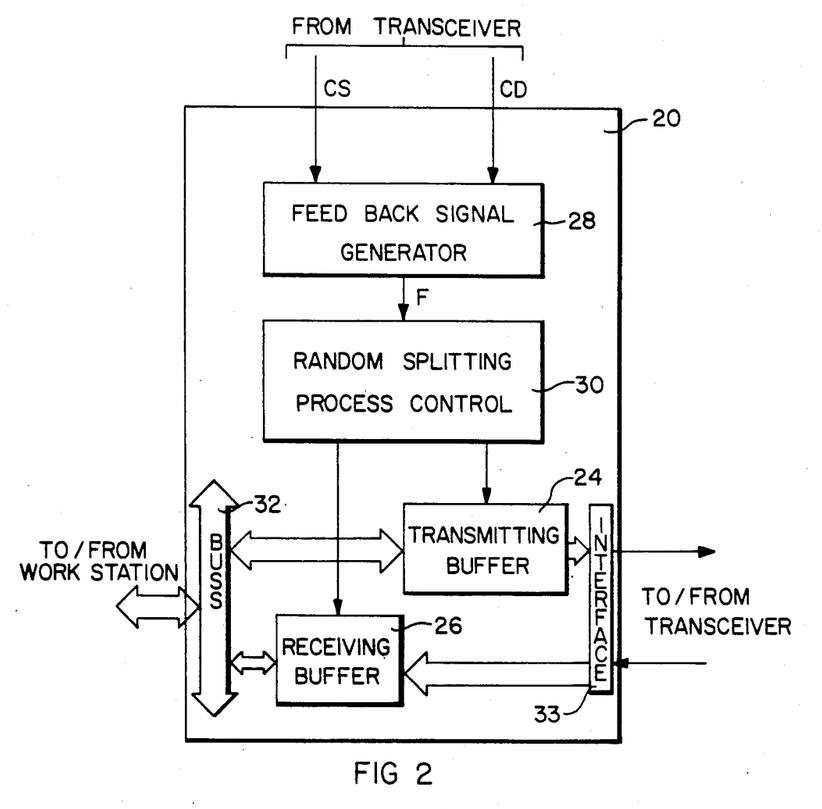
FIG. 2 is a block diagram illustrating the functional organization of the communication controller shown in FIG. 1.

Referring now to FIG. 2, the communication controller 20 receives the carrier sense signal CS and the conflict detection signal CD from the transceiver.

A feedback signal generator 28 receives the carrier sense signal CS and the conflict detection signal CD and generates a feedback signal F as described below. The random splitting process control means 30 employs the feedback signal F to control the transmission and reception of image and data packets from the transmitting buffer 24 and the receiving buffer 26 as described below. The transmitting and receiving buffers 24 and 26 are connected to the workstation 22 through a data buss 32, and to the transceiver through an interface 33.

The feedback signal generator 28 and the random splitting process control means 30 can be implemented by hardware, software, or firmware. For example, the communication controller may comprise a programmed microprocessor connected to buffer memories that store the data and image packets to be transmitted and received.

Before describing the communication controller 20 in more detail, the operation of the system will be described on a global basis, i.e., on the basis of the net result of the cooperation among all of the communication controllers in the system. Packet transmissions are organized into cycles and sessions. A session is the time period required to transmit all the data packets that arrived during the last session, or to transmit one of the image packets that arrived in the last cycle, if no data packets arrived during the last session. The data or image packet is held in the transmitting buffer 24 until it is successfully transmitted.

In the following description, a session will be called a "data session" if it is devoted to the transmission of data packets or an "image session" if it is devoted to the transmission of one image packet A session will be called an empty session if it is composed of two successive empty slots.

A cycle is the time period required to transmit all the image packets that arrived during the previous cycle. If no image packet arrives during the previous cycle, the current cycle is ended by an empty session. A cycle may be composed of: (1) an empty session; (2) a number of data sessions followed by an empty session; (3) a single image session; or (4) a composition of image and data sessions.

The data packets that arrived in a session are all successfully transmitted in the next session employing the random splitting process. Similarly, the image packets that arrived in a cycle are all successfully transmitted in the next cycle. In each cycle, an image session begins only if no data packets arrived in the previous session. To reduce the delay of data packet transmissions to an acceptable value, only one image packet is permitted to be transmitted in each image session. The rest are held for the next session.

Figure 3:
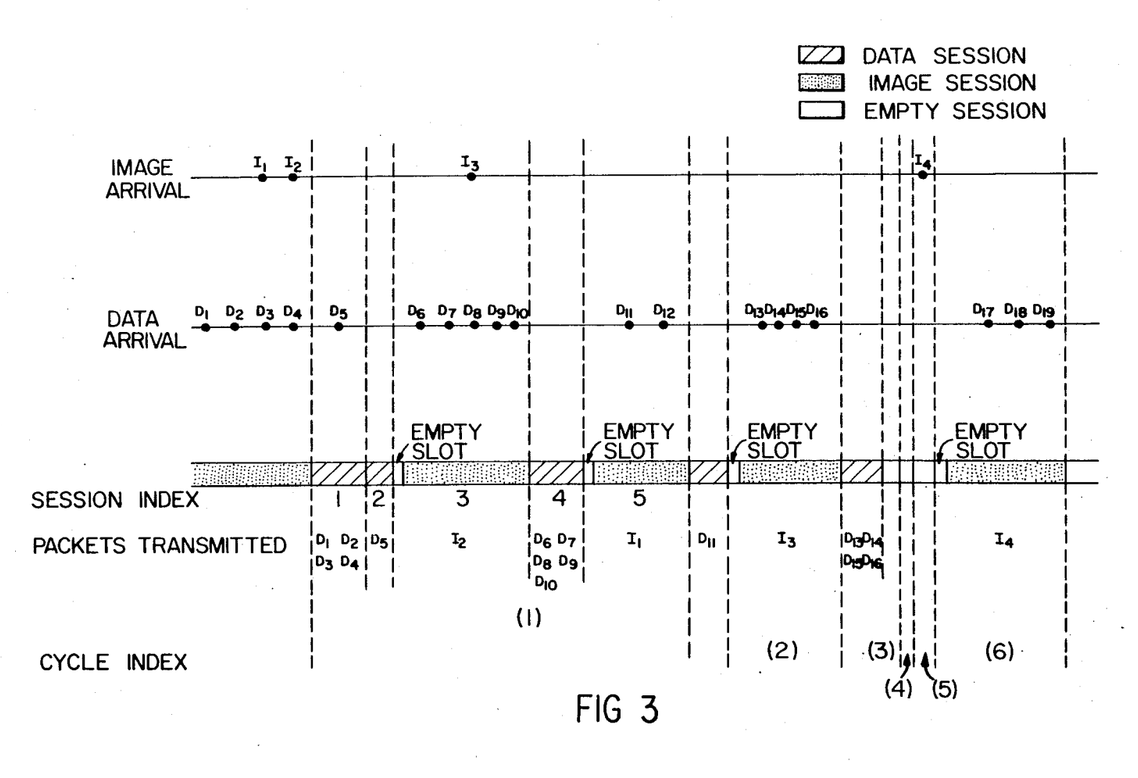
FIG. 3 is a timing diagram illustrating an example of the overall operation of the communication system according to the present invention.

An example of packet transmission by the PRS/CD method according to the present invention is given in FIG. 3. In the example, there are two image arrivals, $I_1$ and $I_2$, and four data arrivals, $D_1$, $D_2$, $D_3$ and $D_4$ at the beginning of cycle one as indicated by the dots on the image arrival and data arrival time lines respectively. Data packets, D1 through D4, are authorized to transmit before image packets $I_1$ and $I_2$ because of their higher priority. The complete resolution of conflicts between these packets by the random splitting process constitutes session 1. During this session, another data packet, $D_5$, arrives. Therefore, session 2 is devoted to its transmission since any data packet arriving during the previous session has priority over an image packet.

During session 2, no data packet arrives. Hence, there is no data packet to be transmitted immediately after the end of session 2. This results in an empty slot. The length of a slot in the PRS/CD method is the length of the maximum signal propagation delay between two terminals in the system which is much shorter than the length of a slot in the prior art random splitting method.

At this point, every active communication terminal in the system knows that no data arrived in session 2. The image packets, $I_1$ and $I_2$, are eligible to be transmitted in session 3. The order of their transmission is determined by a random splitting process which results in the successful transmission of one of the image packets, say $I_2$. The successful transmission of $I_2$ ends session 3.

The image packet $I_1$ is held for the next image session in the first cycle. During session 3, the data packets $D_6$ through $D_{10}$ arrived. Accordingly, session 4 is dedicated to data packet transmission. A new image arrival $I_3$ is held until the next cycle. Session 5 is dedicated to the transmission of image packet $I_1$ because no data packets arrived in session 4. All the image packets that arrived in the previous cycle have been completely transmitted by the end of session 5, ending cycle 1.

The image packet $I_3$ which arrived in cycle 1 is transmitted in cycle 2. However data packets $D_{11}$ and $D_{12}$ that arrived during session 5 of cycle 1 are transmitted in the first session of cycle 2 before the transmission of image packet $I_3$ in the second session of cycle 2. Data packets $D_{13}$ through $D_{16}$ arrived during session 2 of cycle 2, and are transmitted during session 1 of cycle 3.

Cycle 3 consists of a data session (transmission of data packets $D_{13}$ through $D_{16}$), and an empty session because no image packets arrived in cycle 2. Cycle 4 and cycle 5 are empty sessions because no image or data packets arrived in cycle 3 and cycle 4, respectively. Finally, cycle 6 is a single image session to transmit image packet $I_4$ that arrived during cycle 5. The transmission of data and image packets continues in this manner.

The operation of the communication ontroller 20 will now be described in detail from a local rather than a global perspective. In the preferred mode of practicing the invention, the communication controller 20 is implemented in the form of a programmed microprocessor and associated buffer memories for holding image and data packets to be transmitted and received. The program for the microprocessor includes a set of registers F, G, I, B, U; R and S which are defined as follows:

F is a Channel Feedback Signal $F = 0$ if the channel is silent at the decision-making instant, that is r units later than the completion of the last transmission or later than the previous decision-making instant, where r is the maximum terminal-to-terminal signal propagation time in the network. The r duration period for the feedback signal is called an empty slot.

$F = 1$ if the channel is busy at the decision-making instant and the transmission is a successful data packet;

$F = 2$ if the channel is busy at the decision-making instant and the transmission is a successful image packet;

$F = 3$ if the channel is busy at the decision-making instant and the transmission is a collision fragment. The transmitter immediately stops its transmission once it detects that the ongoing packet has collided with another packet. The incomplete transmission of the collided packets is called a collision fragment.

G is a global pointer whose value at any given time is the same in all terminals. The value of G is updated by information from the feedback signal that is available to all terminals in the system.

I is an individual indicator associated with each terminal. Data packets start out with $I = 2$, image packets start out with $I = 1$ or 0 depending on the prior history of the system.

B is a random binary number, locally generated independently at each transmitting terminal when a collision is detected, and is added to I to randomly assign the terminal to a transmitting group or a non-transmitting group.

U is a global binary pointer employed in the cycle control process.

R is an individual indicator employed in the cycle control process, indicating when a specific terminal has an image packet to be transmitted in the present cycle.

S is a global parameter employed in the cycle control process to indicate whether there has been a successful data packet transmission in the ongoing session.

Figure 4:
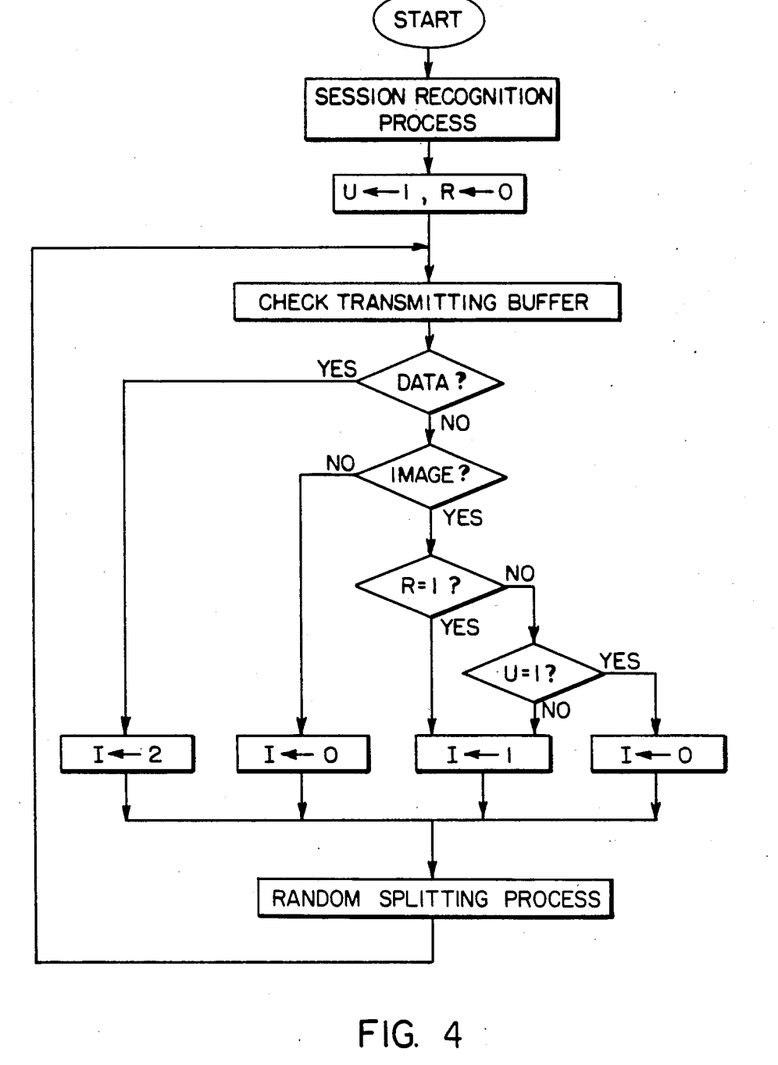
FIGS. 4-8 are flow charts illustrating the operation of the communication controller according to the present invention.

Referring now to FIG. 4, the overall control process of the communication controller 20 is described. When a terminal called a "new user" first joins the system, it executes a session recognition routine to locate one of the session boundaries from which it can keep track of the random splitting process. Once a session boundary is recognized, the terminal joins in the next session, executing the random splitting process recursively. Before entering the random splitting process, however, the terminal initializes the value of the individual indicator I. If a data packet is waiting in the buffer to be transmitted, I is set equal to 2, otherwise, I is set equal to 1 or 0 depending on the values of U and R.

Figure 5:
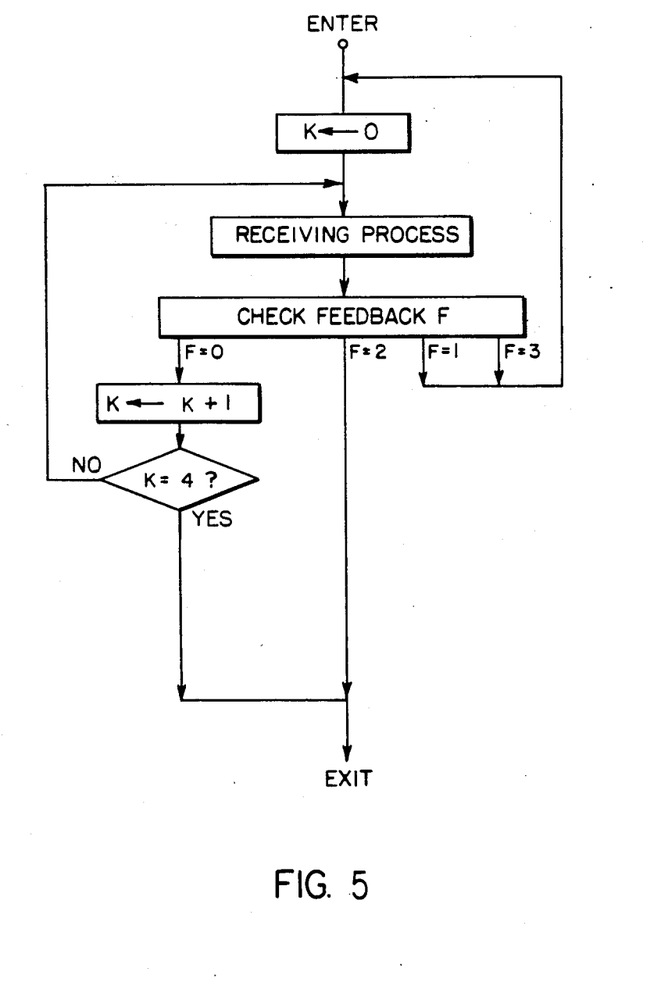

FIG. 5 illustrates the session recognition process. First a counter K is set to 0, then the receiving process is executed. The receiving process generates a feedback signal F as described below. The session recognition process "listens" to the channel until either an image packet is received ($F = 2$) or 4 consecutive empty slots are observed ($F = 0$, 4 times in a row). If an image packet is detected ($F = 2$), the session recognition process exits to mark the boundary of a session immediately after the image session. If 4 empty slots are observed in a row, the session recognition process assumes, with near certainty, that the system is in an empty session. However, because an empty session comprises two empty slots in a row, the terminal does not know whether the last empty slot it observed was the first or the second empty slot of an empty session.

It was stated above that after 4 empty slots there was a high probability that the system was in an empty session. This was not stated to be a certainty because there is a probability, although small, that these 4 empty slots are part of a conflict resolution in the previous session. The number 4 is chosen to be large enough to make this probability small.

Therefore, there are two possibilities of recognition errors. First, it is possible, although with low probability, that the 4 empty slots are part of a conflict resolution session for either data or image packets. Second, because an empty session is composed of two empty slots, the boundary marked by a new user may be one slot off.

After obtaining an estimate of the session boundary, the "new user" can transmit its packet when ready. If the packet transmission is successful, all the users of the network will automatically adjust to the new boundary. If the transmitted packet is an image packet, all the users exit from the random splitting process (described below) as in the normal case, and consent to this new boundary. If the packet transmitted is a data packet, all the users will exit the random splitting process since $K > 4$ and $S = 1$, and consent to this new boundary.

If there are some packet transmissions by other users before the new user transmits any packet, the new user will correct the session boundary based on channel feedbacks. The correction for the new user is based upon the ordinary session and cycle recognition procedures contained in the random splitting process described below.

If the "new user" observes a collision while transmitting his packet, it indicates that errors might have been made in the recognition process by the "new user". The procedures for conflict resolution and boundary correction are then executed by all the terminals.

If the collision results from data packets or image packets alone, the collision is resolved by the random splitting process and all the terminals, including the "new user", will consent to a boundary at the end of conflict resolution. Any errors that may have been made in boundary identification in this case are thus corrected.

If a data packet transmitted by the "new user" collides with a number of image packets, it means that the new user made a session recognition error. The "new user" will have to correct the boundary error, since it is actually in an image session. The conflict is resolved by the random splitting process as described below, and the data packet will be successfully transmitted before the image packet is transmitted. Whenever $G = 1$, $S = 1$ and $K > 4$, none of the terminals are allowed to exit the random splitting process to guarantee that one image packet is transmitted per session. The "new user" observes the boundary of the image session and corrects its error. The data packet transmitted by the "new user" is either successfully transmitted or held until the next data session.

If an image packet transmitted by a "new user" collides with a number of data packets, it means that the network is actually in a data session. The image packet will be successfully transmitted in this data session by the random splitting process. In this case, all the terminals consent to the new boundary enforced by the image transmission.

In summary, a "new user" can transmit his packet any time after the session recognition process shown is FIG. 5 is completed. Any recognition error will be automatically corrected by recovery provisions in the random splitting process. Although some overhead is introduced by the recognition process the effect on overall performance is minimal.

Figure 6:
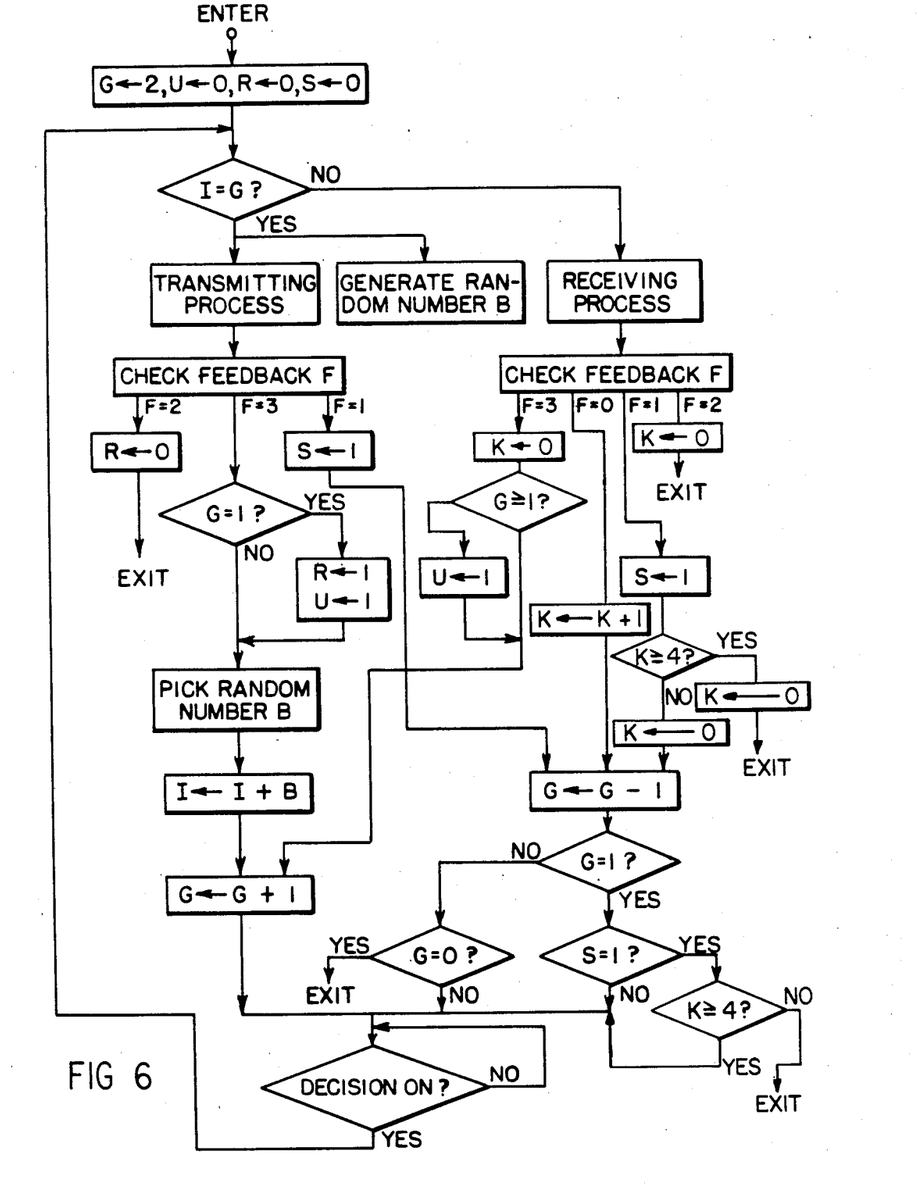

After the terminal has been initialized by finding or enforcing a new session boundary, the controller 20 executes the random splitting process shown in FIG. 6. The random splitting process is a conditional loop that generates the sessions and cycles in cooperation with other terminals. Before entering the loop, the control parameters G, U, R and S are set as shown in the top of FIG. 6. At the beginning of the loop, the local parameter I is compared with the global pointer G to determine whether the terminal will be allowed to transmit, or to receive. The terminal is allowed to transmit only when $G = I$. If $G = I$, the transmitting process is invoked, and at the same time a random binary number B is generated. After the transmission, the feedback signal F is checked to determine whether a successful data packet or image packet was transmitted, or whether a collision resulted. If a collision resulted ($F = 3$), the local indicator I is incremented by the random binary number (0 or 1) and the global pointer G is incremented by 1.

Whenever two or more terminals generate the same random binary number B, a new collision will result. On each successive pass through the random splitting process, each terminal involved in a collision randomly assigns itself to a transmitting group or a non-transmitting group. On the next pass through the random splitting process, all terminals in the transmitting group again attempt to transmit. Finally, by the random binary splitting process, only one terminal will be left in the transmitting group This terminal will then be able to successfully transmit its packet. After the successful transmission, G is decremented by 1 in all of the terminals, and the random splitting process is repeated. If $G = I$ in more than one terminal, a new collision will result, and the random splitting process will again resolve the conflict as described above.

The random splitting process continues in this manner, resolving the conflicts that occur, until all the data packets received during the previous session have been transmitted. As noted above, all data packets were initialized with $I = 2$, and image packets were initialized with $I = 1$ or 0, therefore all of the terminals having data packets to transmit will successfully transmit the data packets before any image packets are transmitted. However, when all of the data packets have been transmitted, and G is decremented to 1, the image packets can be transmitted. If a collision between image packets results, each transmitting terminal generates a random binary number B, increments its individual indicator I by 1 or 0, and increments G. The terminals having $G = I$ transmit, and the process repeats until only one terminal has $G = I$. This terminal then successfully transmits its image packet. However, when the successful transmission of an image packet is detected ($F = 2$), R is set to 0, and the random splitting process returns to the overall control process, FIG. 4. This has the effect of concluding the session, and allowing any recently arriving data packets to be transmitted before another image packet is allowed to be transmitted.

If no data packets are to be transmitted, an empty slot results and G is decreased to 1 and image packets are transmitted. Unlike the situation for the data packets however, the value of G is not automatically decremented after each image packet transmission, rather the random splitting process is exited and G is reset to 2 when control is returned to the random splitting process.

When, on the other hand, the local indicator I is not equal to G in any of the terminals (see FIG. 6) the random splitting process branches to the receiving process. The receiving process monitors the channel and generates the feedback signal F. If a collision occurs ($F = 3$), the value of G is incremented by 1, and the random splitting process loop is repeated. If the channel is idle ($F = 0$) or if a data packet was successfully transmitted ($F = 1$) G is decremented by 1, and the random splitting process is again repeated. If an image packet was transmitted ($F = 2$) the random splitting process returns to the overall control process (see FIG. 4) to start a new session. The increments to and checks on the value of K in the receiving process cooperate with the session recognition process as described above to define new boundaries when a new terminal enters the network.

Generally, all terminals monitor the boundaries of sessions and cycles for packet transmissions. The terminals that have been active in the network continuously keep track of the boundaries of sessions and cycles by the channel feedback signal F and by the values in registers G, I, S, R and U. The session and cycle recognition exercised by all the terminals are as follows: The end of an image transmission indicates the boundary of an image session. The end of a cycle is indicated by either the end of an image session without any collision fragment, or an empty session consisting of two empty slots. The boundary of a data session is marked when $G = 1$ and $S = 1$.

The recognition of session and cycle boundaries for "new users" who just joined the network proceeds as outlined above with reference to the session recognition process.

Figure 7:
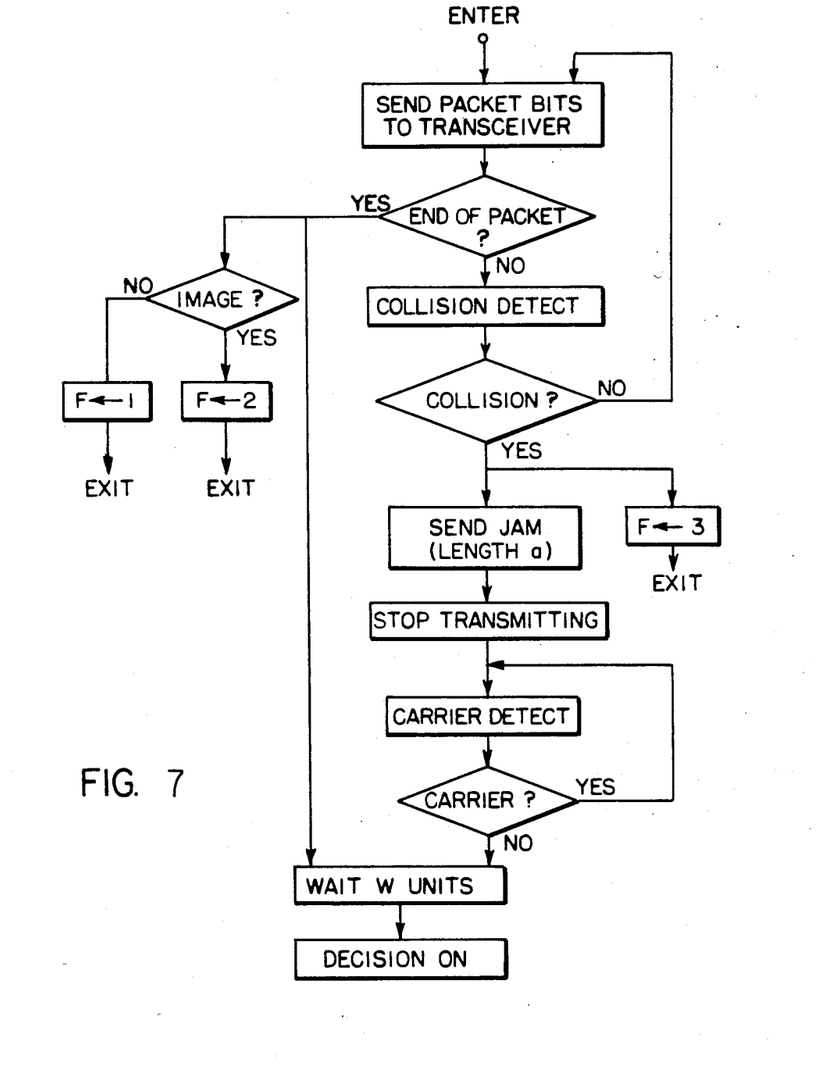

The transmitting process will now be described with reference to FIG. 7. When the transmitting process is called by the random splitting process, the transmitting process starts sending the packet of bits to the transceiver and checks for the end of the packet. It then checks if a collision has been detected.

If no collision is detected, the complete packet is sent. At the end of a packet transmission, the feedback signal F is generated to indicate whether the packet was an image packet, or a data packet If a collision is detected, the transmitting process generates the feedback signal $F = 3$ to indicate a collision, and sends a jamming signal of length "a" to insure that the other terminals detect the collision, and stop transmitting. The transmitting process then waits until no more carrier is detected on the channel, waits a further length of time w to allow the hardware to recover, and sets the "DECISION ON" flag that signals the random splitting process to execute another loop.

Figure 8:
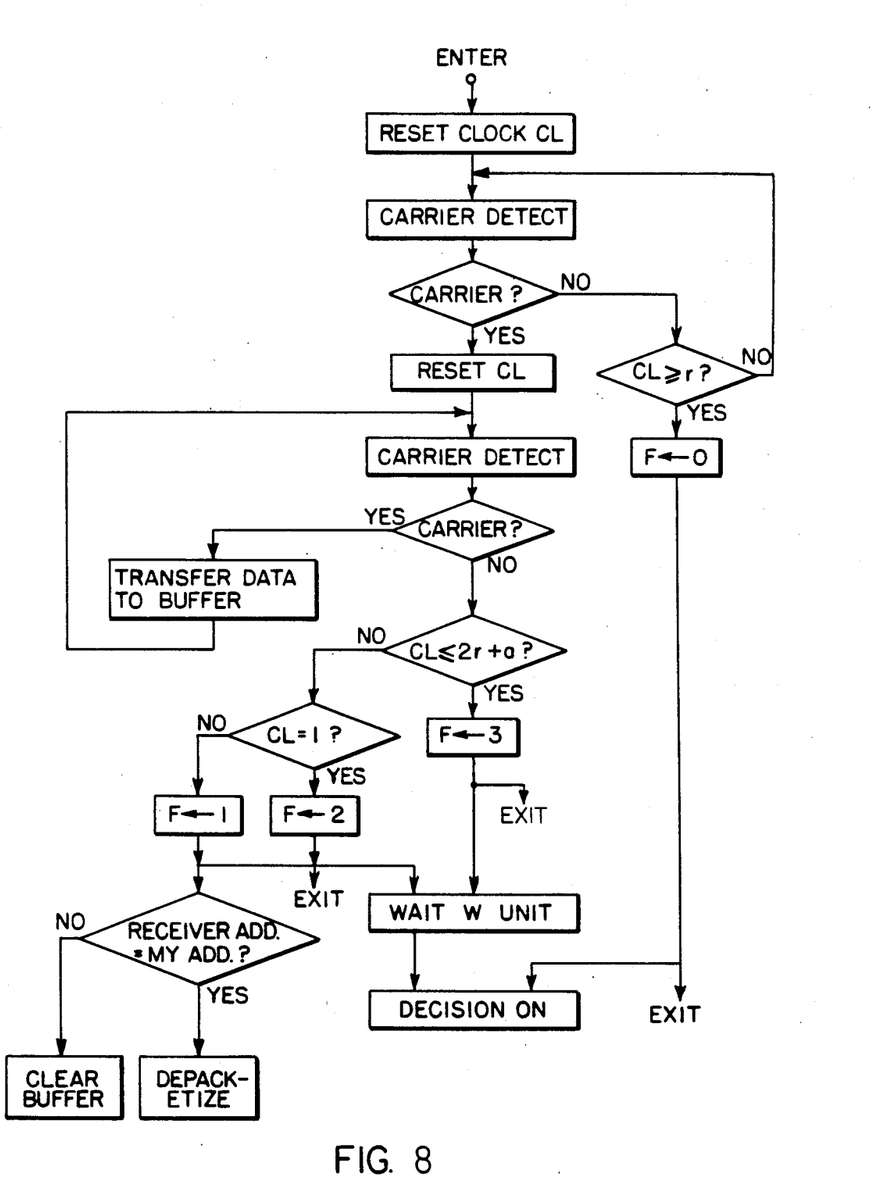
Figure 9A:
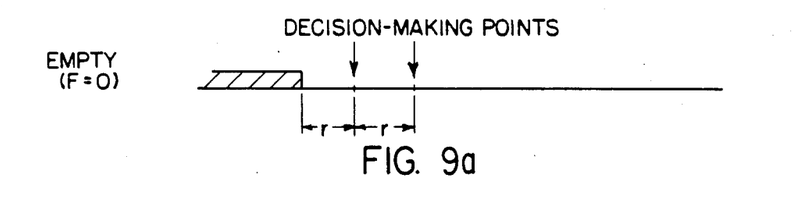
FIGS. 9a-d are timing diagrams useful in describing the feedback signal used with the communication controller according to the present invention.
Figure 9B:
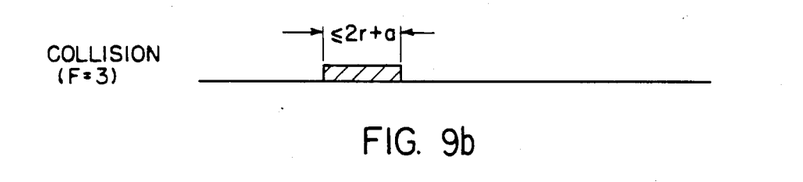
Figure 9C:
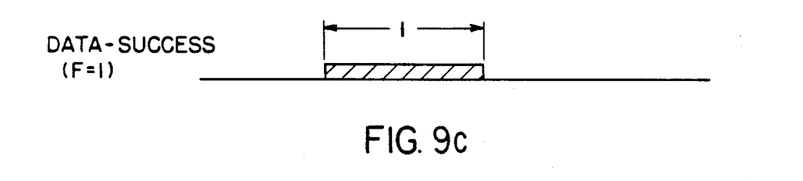
Figure 9D:
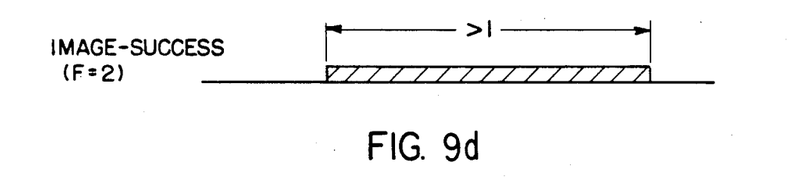

The receiving process will now be described with reference to FIG. 8. The receiving process starts a clock CL and listens for a carrier on the channel. If no carrier is detected for a period of time r, a feedback signal F=0 is generated and the control is returned to the random splitting process. If a carrier is detected, the clock is reset, and the packet being received is stored in the buffer. At the end of the transmission, the length of the received packet is checked to determine if it is a data packet (CL=1), an image packet (CL>1) or a collision fragment (CL≦2r+a) and generates a feedback signal accordingly. In the foregoing description, the length of a data packet is normalized to 1 for ease of description. If the packet is a data or image packet, the receiving process checks the address to see if its terminal is the intended recipient. If so, the receiving process unpacks the message and forwards it to the workstation. If its terminal is not the intended recipient, the receiving process clears the buffer, executes a delay of time w to allow the hardware to recover, sets the "DECISION ON" flag, and returns control to the random splitting process.

FIGS. 9-d are timing diagrams illustrating the time periods employed in the receiving process for generating the feedback signals. FIG. 9a illustrates two empty slots of length r after a transmission, and the decision-making points at the ends of the empty slots. FIG. 9b illustrates a collision fragment having a length less than or equal to 2r+a. FIG. 9c illustrates the length of a data packet (normalized to 1), and FIG. 9d illustrates the length of an image packet (length greater than 1, e.g. 10).

Figure 10:
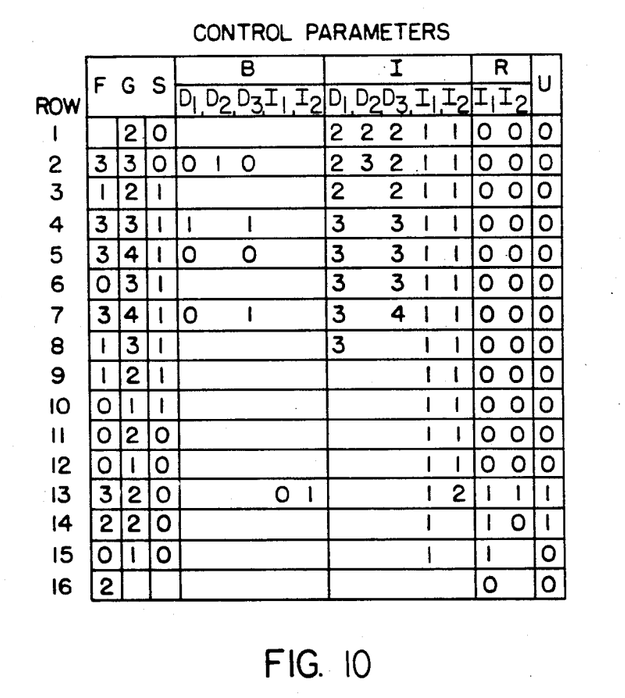
FIG. 10 is a table of control parameter values useful in describing the operation of a preferred mode of practicing the present invention.

More detailed operation of the communication controller will now be described by considering an example. In the example, 3 data packets arrived during the last session of the previous cycle and 2 image packets arrived during the previous cycle at five terminals in the communication system. The data pakcets and their respective terminals are designated $D_1$, $D_2$ and $D_3$, and the image packets and their respective terminals are designated $I_1$ and $I_2$. At the start of the random splitting process, the control parameters in the five terminals were as shown in row 1 of FIG. 11. In the first pass through the random splitting process in each terminal, the value of I is compared with G to determine whether the terminal will be transmitting or receiving. Since I does not equal G for $I_1$ and $I_2$, they are not allowed to transmit and just update their registers F, G, S and U. Since I=G for $D_1$, $D_2$ and $D_3$, these three terminals transmit simultaneously, resulting in a collision. When the collision is detected, the transmitting terminals stop transmitting, generate a feedback signal F=3, and return to the random splitting process. At the same time, the receiving terminals detect the absence of carrier, and note from the duration of the transmission, that the transmission was a collision fragment. The receiving terminals then generate a feedback signal F=3 and return to their respective random splitting processes.

Back in the random splitting process, the transmitting terminals $D_1$, $D_2$ and $D_3$ generate random binary numbers B and increment their indicators I by B. All terminals increment G by 1. Assuming that the random binary numbers generated by terminals $D_1$, $D_2$ and $D_3$ were 0, 1 and 0 respectively, the control parameters are now as shown in row 2 of FIG. 10.

During the next pass through the random splitting process, only terminal $D_2$ has I equal to G, and therefore terminal $D_2$ successfully transmits a data packet. As a result of the successful transmission of the data packet, all the terminals generate a feedback signal F=1, set the pointer S=1, and decrement G by 1. As a result the control parameters are as shown in row 3 of FIG. 10.

In the next pass through the random splitting process, both data packets $D_1$ and $D_3$ are transmitted simultaneously, causing a collision. Assuming that both terminals $D_1$ and $D_3$ generate a random binary number 1, the resulting states of the control parameters are as shown in row 4 of FIG. 10.

Again, both terminals $D_1$ and $D_2$ transmit resulting in a collision. This time, however, assume both terminals generate a random binary number 0. The results are as shown in row 5 of FIG. 10.

In the following pass through the random splitting process, none of the terminals could transmit since G=4 was greater than the I values in any of the terminals, thus resulting in an empty slot. At the end of the empty slot, the control parameters are as shown in row 6 of FIG. 10. Again both terminals $D_1$ and $D_3$ transmit and collide. This time however, assume terminal $D_1$ generates a random binary number 0 and terminal $D_3$ generates a random binary number 1 as shown in row 7 of FIG. 10. As a result, data packet $D_3$ is successfully transmitted, and the states of the control parameters end up as shown in row 8 of FIG. 10.

Next, data packet $D_1$ is successfully transmitted and the results are as shown in row 9 of FIG. 10. The following pass through the random splitting process produces an empty slot since none of the image packets have an I equal to 2 with the results shown in row 10 of FIG. 10. Since S=1 from the last data packet transmission, and G 32 1, the random splitting process passes back through the overall control process. Upon returning to the random splitting process, G is set equal to 2 and U, R and S are set equal to 0. This insures that any data packets that may have arrived during the previous session would be transmitted before the image packets. The control parameters are then as shown in row 11 of FIG. 10. An empty slot results since no data packet is to be transmitted and image packets are not allowed to be transmitted, after which the control parameters are as shown in row 12 of FIG. 10. This time, since S was reset to 0, the random splitting process continues to loop internally. On the next pass, both image packets $I_1$ and $I_2$ are transmitted, resulting in a collision. Since F=3 and G has been decremented to 1, R and U are set equal to 1. Assuming that the terminal $I_1$ generates a random binary number 0, and the terminal $I_2$ generates a random binary number 1, the resulting control parameters are as shown in row 13 of FIG. 10.

This time, the terminal $I_2$ successfully transmits an image packet. The feedback signal is F=2, causing R to be reset to 0 for the terminal $I_2$ and causing control to return to the overall control process. The control parameters for terminal $I_1$ are as shown in line 14 of FIG. 10. Since G is reset to 2 upon returning to the random splitting process, and the I value for packet $I_1$ is 1, and assuming there were not data packets arriving during the transmission of image packet $I_2$, an empty slot results. The feedback signal is F=0, G is decremented by 1, and the control parameters are as shown on row 15 of FIG. 10.

Finally, image packet $I_1$ is transmitted, the feedback signal is F=2, R is set to 0, and the cycle is over. The control parameters end up as shown in line 16 of FIG. 10.

The communication controller continues cycling in this manner, transmitting all data packets arriving in the previous session and the present session before transmitting an image packet, transmitting only one image packet per image session, and transmitting all image packets arriving in the previous cycle before going to the next cycle.

Figure 11:
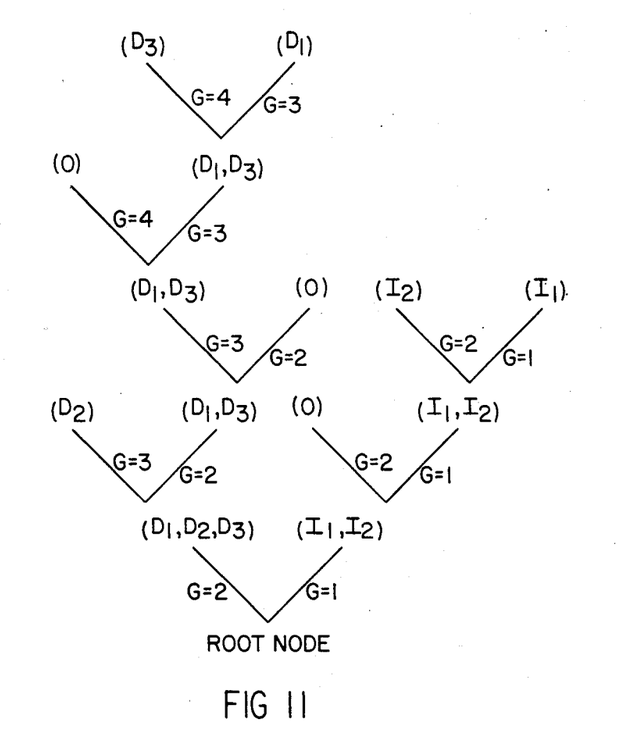
FIG. 11 is a tree diagram illustrating an example of the operation of the communication controller according to the present invention.

FIG. 11 shows the random binary tree that is generated by the above described sequence of steps. The tree is separated at its root node into two subtrees, one for data packets, another for image packets. Branches of the tree that are barren (zeros) represent empty slots. The other branches show where a transmission took place. In the example, no data packets arrived during any of the sessions, and two consecutive image sessions were executed after the data session. Had any data packets arrived during the ongoing sessions, the image packets would have been held, and a new data tree would have been generated prior to the transmission of the next image packet.

Although the terms data packet and image packet have been employed in the description for convenience, the invention is not limited to transmitting data and images, but will find use in transmitting information packets of mixed sizes wherein the lengths of the information packets differ by one or more orders of magnitude.

INDUSTRIAL APPLICABILITY AND ADVANTAGES

The present invention is useful in communication systems such as local area networks for transmitting information between a group of communication terminals that share a communication channel. The PRS/CD packet switched communication system according to the present invention has the advantage that the system is stable in the presence of increasingly heavy traffic. That is to say that the efficiency of channel use does not decline as the traffic increases. The system has the further advantage that the channel utilization is increased over the prior art random splitting process, due to the quick feedback information provided by the collision detection aspects of the system. The PRS/CD communication system has the further advantage that due to prioritization of the information types, the transmission of higher priority information packets experience shorter transmission delays than those of lower priority information packets.

We claim:

1. A packet switched, local communication system comprising:
    a. a communication medium; and
    b. a plurality of communication terminals connected to said communication medium for communicating information comprising short packets and long packets, long packets being larger than short packets by one or more orders of magnitude, said communication terminals including:
        (1) transceiver means for transmitting and receiving a signal on said medium, said transceiver means including means for detecting the presence of a carrier on said medium and generating a carrier sense signal in response thereto, and means for detecting a collision between information packets on said medium and generating a conflict detection signal in response thereto,
        (2) workstation means for generating short and long information packets to be sent to other communication terminals, and for receiving short and long information packets sent from other communication terminals, and
        (3) communication control means coupled between said transceiver means and said workstation means responsive to said carrier sense and conflict detection signals for controlling the transmission of information packets such that conflicts between the transmission of information packets from different terminals are resolved by a random splitting process, and the transmission of short packets is given priority over the transmission of long packets.

2. The communication system claimed in claim 1, wherein said communication control means in said plurality of communication terminals operate in a manner having the effect of organizing the transmission of packets into cycles composed of one or more sessions; a session being the time required to transmit all the short packets arriving during the previous session, or the time required to transmit one long packet that arrived during the previous cycle if no short packets arrived during the previous session, and a cycle being the time required to transmit all the long packets that arrived during the previous cycle; if no long packets arrived during the previous cycle, a cycle ending with an empty session, a session being an empty session when no packet arrived by the end of the previous session.

3. The communication system claimed in claim 2, wherein said communication control means includes:
    a. feedback signal generating means responsive to the carrier sense signal and the conflict detection signal for generating a feedback signal indicating no carrier, data packet transmitted, image packet transmitted, or collision; and
    b. random splitting process control means responsive to a collision feedback signal for randomly assigning a packet to a transmitting group or a non-transmitting group, for determining whether the packet will be transmitted at the next available opportunity.

4. The communication control system claimed in claim 3, wherein said communication control means further includes session recognition means responsive to the feedback signal for detecting the boundary of a session.

5. The communication control system claimed in claim 3, wherein said communication control means further includes means responsive to a detected collision for sending a jamming signal of predetermined length to insure that all terminals in the system successfully detect the collision.

6. The communication system claimed in claim 3, wherein said random splitting process control means includes a first register G for storing a global pointer, a second register I for storing an individual indicator associated with a packet to be transmitted; and means for randomly generating a binary digit B after each collision, the random splitting process control means including means for adding the binary digit to the contents of register I, for incrementing the global pointer G each time a collision is detected, and for decrementing the global pointer G each time a packet is successfully transmitted, the random splitting process control means further including means for comparing the contents of registers G and I and enabling transmission of the packet when G=I.

7. The communication system claimed in claim 6, wherein said random splitting process control means includes means for identifying the type of packet to be transmitted as a short packet or a long packet, and for giving transmission priority to the transmission of a short packet after each successful transmission of a long packet.

8. The communication system claimed in claim 7, wherein said means for identifying the type of packet includes a third register U for storing a global pointer indicating whether there are image packets remaining to be transmitted, and a fourth register R for storing an individual parameter indicating that a specific terminal has an image packet to transmit.

9. The communication system claimed in claim 1, wherein said short packets represent digital data, and said long packets represent image information.

* * * * *